UNITED STATES PATENT OFFICE.

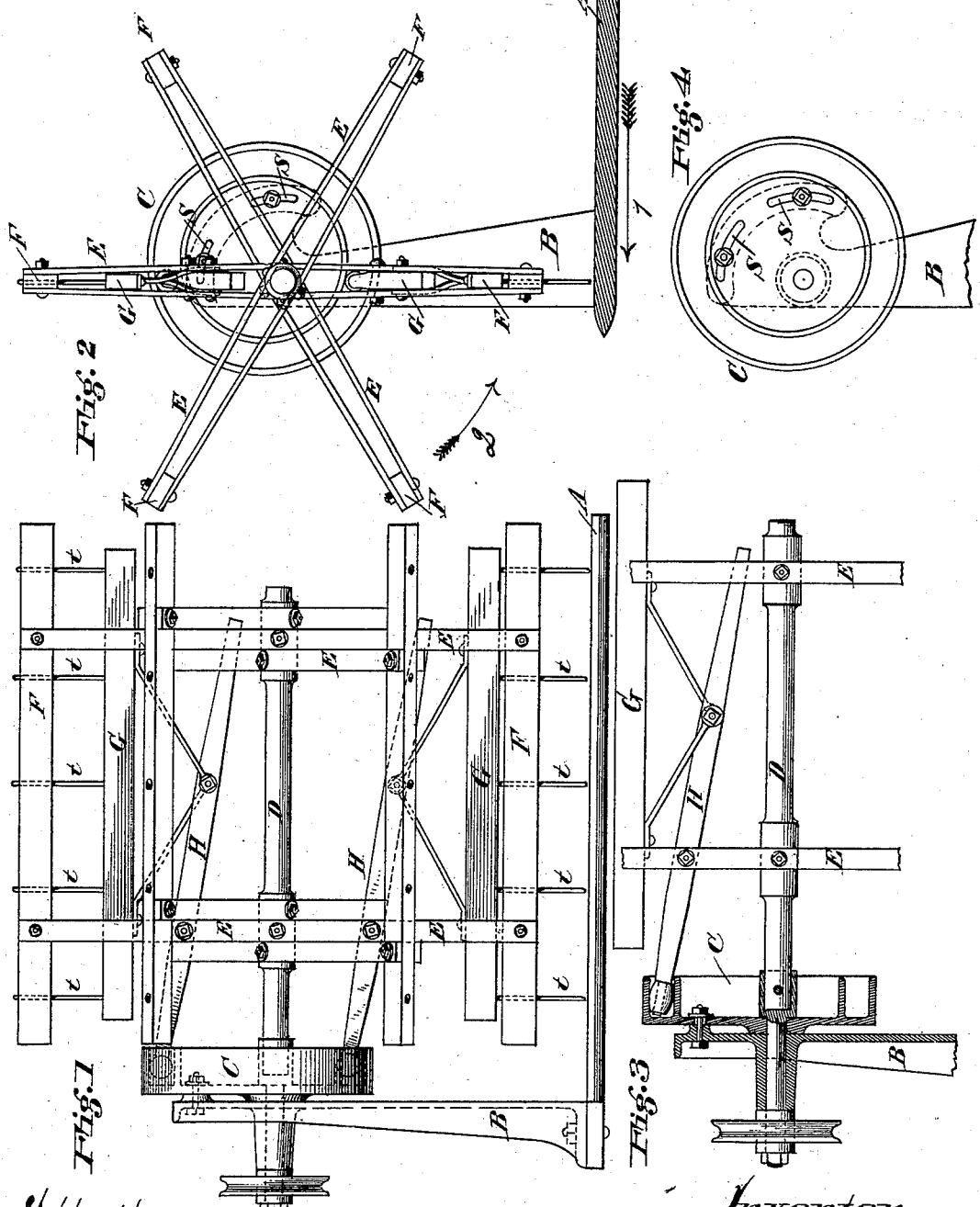

ZENO FISCHESSER, OF WEST SONORA, OHIO.

HARVESTER.

SPECIFICATION forming part of Letters Patent No. 268,211, dated November 28, 1882.

Application filed March 9, 1882. (No model.)

*To all whom it may concern:*

Be it known that I, ZENO FISCHESSER, of West Sonora, in the county of Preble and State of Ohio, have invented certain new and useful Improvements in Harvesters; and I do hereby declare the following to be a full, clear, and exact description of the same.

The object of my invention is to improve the operation of reels for use on harvesters or reapers by providing them with teeth which when the reel is revolved advance and recede, and while advancing take up such straw as had fallen or been blown down on the platform and deliver it properly to the cutter-bar, and while receding clear themselves of any straw which might adhere to them in order to prevent the reel from becoming wrapped with straw.

In the accompanying drawings, Figure 1 is a side elevation of my improved reel, showing the frame-work which composes the wings of the reel and the movable bar in which the teeth are rigidly secured. As will be seen, the teeth have a reciprocating motion in and out of the rails forming the end of each wing through apertures in said rails for such purpose. Fig. 2 is a view in end elevation of Fig. 1. Fig. 3 is a side view, partly in section, showing the eccentric or cam and the arm working therein which operates the reciprocating bar carrying the teeth. This view also shows the mode in which the reel-axle is secured to the arm and how power can be applied for operating the reel by means of a pulley, sprocket-wheel, or other well-known means. Fig. 4 is a view of the cam, showing the slots in same by which it can be adjusted on the standard so that the teeth may be prevented from operating at any desired point.

A is the platform upon which the straw falls as it is cut.

B is the standard, to which the eccentric or cam C is rigidly secured, and through which the reel shaft or axle D projects in order that power may be applied in any suitable way for the working of the reel.

E E E are the radial arms, to which are rigidly secured at right angles rails F F F, the whole forming the wings of which the reel is composed. To each of these wings, or to each alternate one if desired, are attached reciprocating arms G. These arms carry the teeth *t t t* and move between the beams forming the radial arms E, thus forming guideways in the movement back and forth of said reciprocating arms G.

H H are the arms, which are engaged at one end by the cam and travel within it, and at the other end are connected to the reciprocating arms G by suitable cross-arms. The arrow 1 indicates the direction in which the machine is traveling, and the arrow 2 the direction in which the reel is revolving.

S S, Figs. 4 and 5, are the slots through which the bolts or screws are inserted for fastening same to the standard B, and which also allow the cam to be adjusted so that the teeth of the reel may be allowed to work at any desired point.

The operation is as follows: Power being applied to the axle or shaft of the reel, the same is revolved, carrying with it the arm H, which, traveling in the cam C, receives an eccentric movement and communicates a reciprocating motion to the beam G, in which the teeth are secured. This movement advances the teeth as they approach the platform, and when directly over it they project so far as to gather up the grain and convey it to the cutter-bar, where it is properly cut. As the teeth approach the cutter-bar they recede sufficiently to release what straw is attached to them, and as the reel further revolves they deliver the cut grain to the rear. They are then drawn in altogether till they again approach the cutter-bar, where the above operation is repeated.

The reciprocating arms, with the teeth attached, may be connected to each wing or each alternate one, as desired.

I claim—

1. In a harvester or reaper reel, the combination, with the revolving reel-frame, of reciprocating rake-heads provided with teeth which extend through apertures in the outer wings of the reel, with connecting mechanism whereby the revolution of the wheel causes the teeth to advance or recede through the apertures in the reel-wings, substantially in the manner and for the purpose specified.

2. In a harvester or reaper reel, the reel-frame composed of parallel sets of radial arms E, provided with perforated wings F, attached between their outer extremities, in combination with reciprocating rake-heads G, arranged parallel to the wings F, and provided with teeth $t$, which pass through apertures in the wings F, and mechanism for causing the reciprocation of the rake-heads G, whereby the arms E constitute guides for the reciprocating rake-heads, substantially in the manner and for the purpose specified.

In testimony whereof I have hereunto set my hand.

ZENO FISCHESSER.

Witnesses:
PATRICK H. GUNCKEL,
CHAS. M. PECK.